United States Patent
Adachi (10) Patent No.: US 7,905,304 B2
(45) Date of Patent: Mar. 15, 2011

(54) AUTOMATIC GUIDED VEHICLE DRIVE DEVICE

(75) Inventor: Ryuji Adachi, Tajimi (JP)

(73) Assignee: Aichikikai Techno System Co., Ltd., Nagoya (JP)

( * ) Notice: Subject to any disclaimer, the term of this patent is extended or adjusted under 35 U.S.C. 154(b) by 112 days.

(21) Appl. No.: 12/406,504

(22) Filed: Mar. 18, 2009

(65) Prior Publication Data

US 2010/0078232 A1    Apr. 1, 2010

(30) Foreign Application Priority Data

Sep. 26, 2008   (JP) .................................. 2008-249243

(51) Int. Cl.
*B62D 12/00* (2006.01)
(52) U.S. Cl. .......................................... 180/12; 180/65.1
(58) Field of Classification Search .................... None
See application file for complete search history.

(56) References Cited

U.S. PATENT DOCUMENTS

| 3,380,546 | A | * | 4/1968 | Rabjohn | 180/15 |
| 4,221,273 | A | * | 9/1980 | Finden | 180/6.48 |
| 5,083,625 | A | | 1/1992 | Bleicher | |
| 5,450,320 | A | | 9/1995 | Tsubaki et al. | |
| 5,525,884 | A | | 6/1996 | Sugiura et al. | |
| 6,209,670 | B1 | * | 4/2001 | Fernie et al. | 180/12 |
| 6,390,213 | B1 | * | 5/2002 | Bleicher | 180/65.1 |
| 7,150,463 | B1 | * | 12/2006 | Liao | 280/124.128 |
| 7,191,854 | B2 | * | 3/2007 | Lenkman | 180/65.1 |

FOREIGN PATENT DOCUMENTS

| EP | 1795431 A1 | 6/2007 |
| JP | S58-042493 U | 3/1983 |
| JP | S61-158565 U | 10/1986 |
| JP | H08-011741 A | 1/1996 |
| JP | 3508376 B2 | 3/2004 |
| JP | 3591205 B2 | 11/2004 |
| JP | 2009-208527 A | 9/2009 |

* cited by examiner

*Primary Examiner* — Tony H. Winner
(74) *Attorney, Agent, or Firm* — Global IP Counselors, LLP (57) ABSTRACT

An automatic guided vehicle drive device includes a top plate member, a drive unit, a holding plate member and a turning shaft mechanism. The drive unit has left and right wheel axles attached to left and right wheels, respectively. The holding plate member is coupled between the top plate member and the drive unit to pivotally hold the drive unit with respect to a movement direction. The turning shaft mechanism is coupled between the top plate member and the holding plate member to turnably support the drive unit about a vertical line passing through an intersection between an axial centerline of the wheel axles and a middle line oriented in the movement direction and passes through an approximate middle position between the wheel axles while exerting a force along the vertical line in a direction of separating the drive unit from the top plate member via the holding plate member.

15 Claims, 10 Drawing Sheets

AUTOMATIC GUIDED VEHICLE DRIVE DEVICE

CROSS-REFERENCE TO RELATED APPLICATIONS

This application claims priority to Japanese Patent Application No. 2008-249243, filed on Sep. 26, 2008. The entire disclosure of Japanese Patent Application No. 2008-249243 is hereby incorporated herein by reference.

BACKGROUND OF THE INVENTION

1. Field of the Invention

The present invention relates to an automatic guided vehicle drive device.

2. Background Information

Japanese Laid-Open Patent Publication No. 08-11741 discloses a steering device for an automatic guided vehicle which has a ceiling base plate, a movable base plate, a cylindrical member, a compression coil spring, and a drive unit. The ceiling base plate is attached to a cart of the automatic guided vehicle. The movable base plate is provided such that it can move up and down vertically with respect to the ceiling base plate. The cylindrical member is fixed to a central portion of the movable base plate such that it can move up and down integrally with the movable base plate. The compression coil spring is housed inside the cylindrical member and arranged such that one end thereof abuts against the ceiling base plate and another end thereof abuts against an internal surface step-shaped portion formed inside the cylindrical member. The drive unit is coupled to a lower portion of the cylindrical member through an aligning bearing.

In such a conventional automatic guided vehicle, a rocking motion limiting plate can be provided to protrude from the drive unit and touch against the movable base plate such that the drive unit can be turned about the cylindrical member while limiting the rocking (pivoting) motion enabled between the cylindrical member and the drive unit by the aligning bearing only in the left and right directions with respect to the movement direction. Additionally, a spring force of the compression coil spring is exerted at all times along a steering center of the steering device.

In view of the above, it will be apparent to those skilled in the art from this disclosure that there exists a need for an improved automatic guided vehicle drive device. This invention addresses this need in the art as well as other needs, which will become apparent to those skilled in the art from this disclosure.

SUMMARY OF THE INVENTION

Conventional automatic guided vehicles include towing types that are coupled to a cart at the rear of the automatic guided vehicle and types that are slipped under a cart and tow the cart from underneath. Particularly in the case of the latter type, it is desirable to make the height of the automatic guided vehicle as low as possible.

However, with the steering device for the automatic guided vehicle described in the above-mentioned reference, existence of the aligning bearing and the rocking motion limiting plate restrict the degree to which the height of the automatic guided vehicle can be reduced.

Accordingly, one object is to reduce the height of an automatic guided vehicle while still maintaining the driving performance of the automatic guided vehicle.

In order to achieve the above object, an automatic guided vehicle drive device includes a top plate member, a drive unit, a holding plate member and a turning shaft mechanism. The top plate member is configured and arranged to be attached to a cart body of a vehicle. The drive unit has a left wheel axle attached to a left wheel and a right wheel axle attached to a right wheel with the left and right wheel axles being coaxially arranged and spaced apart from each other in an axial direction, and a drive mechanism operatively coupled to the left and right wheel axles to rotate the left and right wheels. The holding plate member is operatively coupled between the top plate member and the drive unit to pivotally hold the drive unit with respect to a movement direction of the vehicle. The turning shaft mechanism is operatively coupled between the top plate member and the holding plate member to turnably support the drive unit with respect to the top plate member via the holding plate member about a vertical line passing through an intersection point between an axial centerline of the left and right wheel axles and a middle line that is oriented in the movement direction and passes through an approximate middle position between the left and right wheel axles. The turning shaft mechanism exerts a bias force along the vertical line in a direction of separating the drive unit from the top plate member via the holding plate member.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
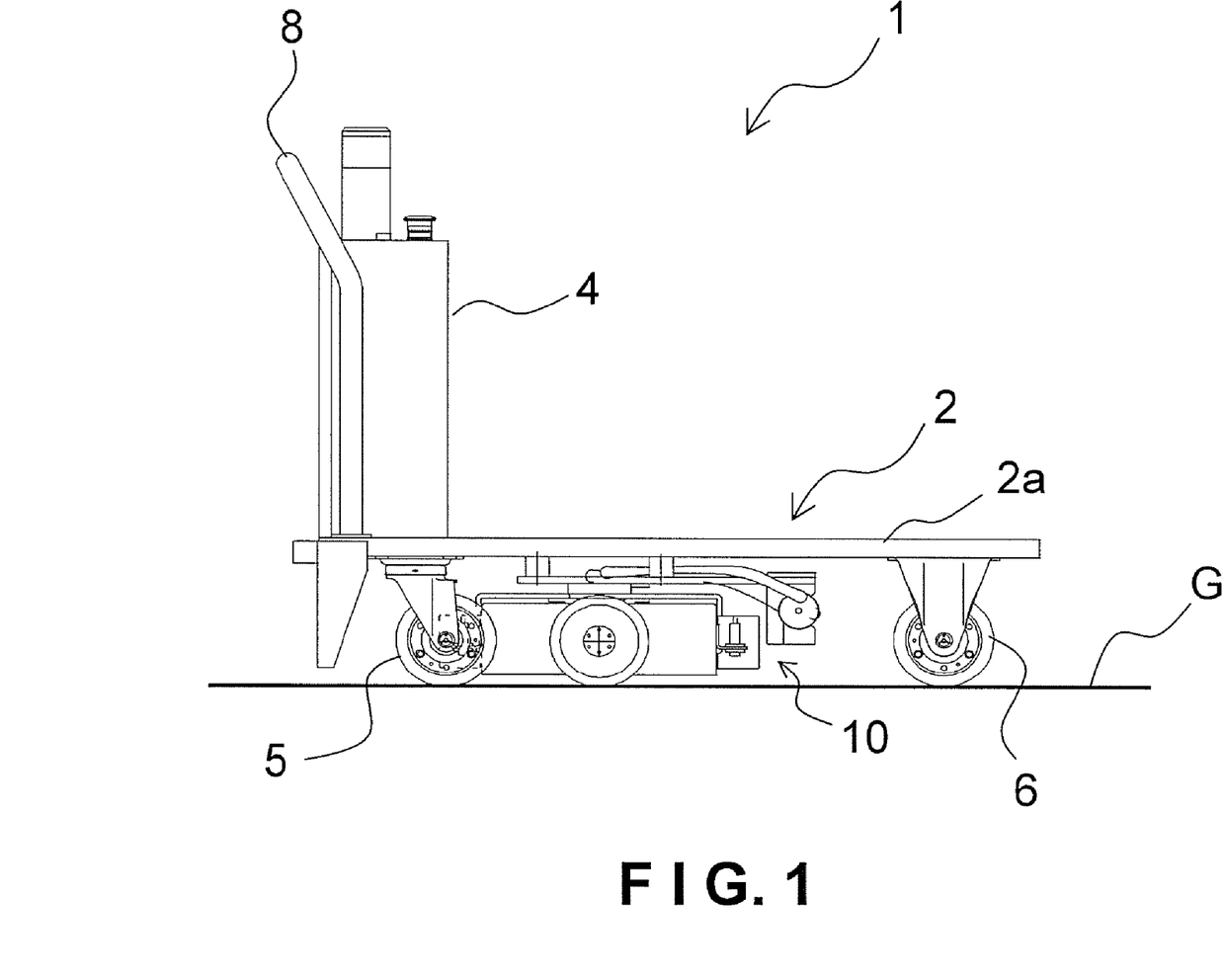
FIG. 1 is a side elevational view of an automatic guided vehicle provided with an automatic guided vehicle drive device in accordance with a first embodiment.

Referring initially to FIG. 1, an automatic guided vehicle 1 provided with a drive device 10 (automatic guided vehicle drive device) is illustrated in accordance with a first embodiment. FIG. 1 is an overall side elevational view of the automatic guided vehicle 1, and FIG. 2 is a top plan view of the automatic guided vehicle 1 with the drive device 10 being shown for illustration purposes.

Figure 2:
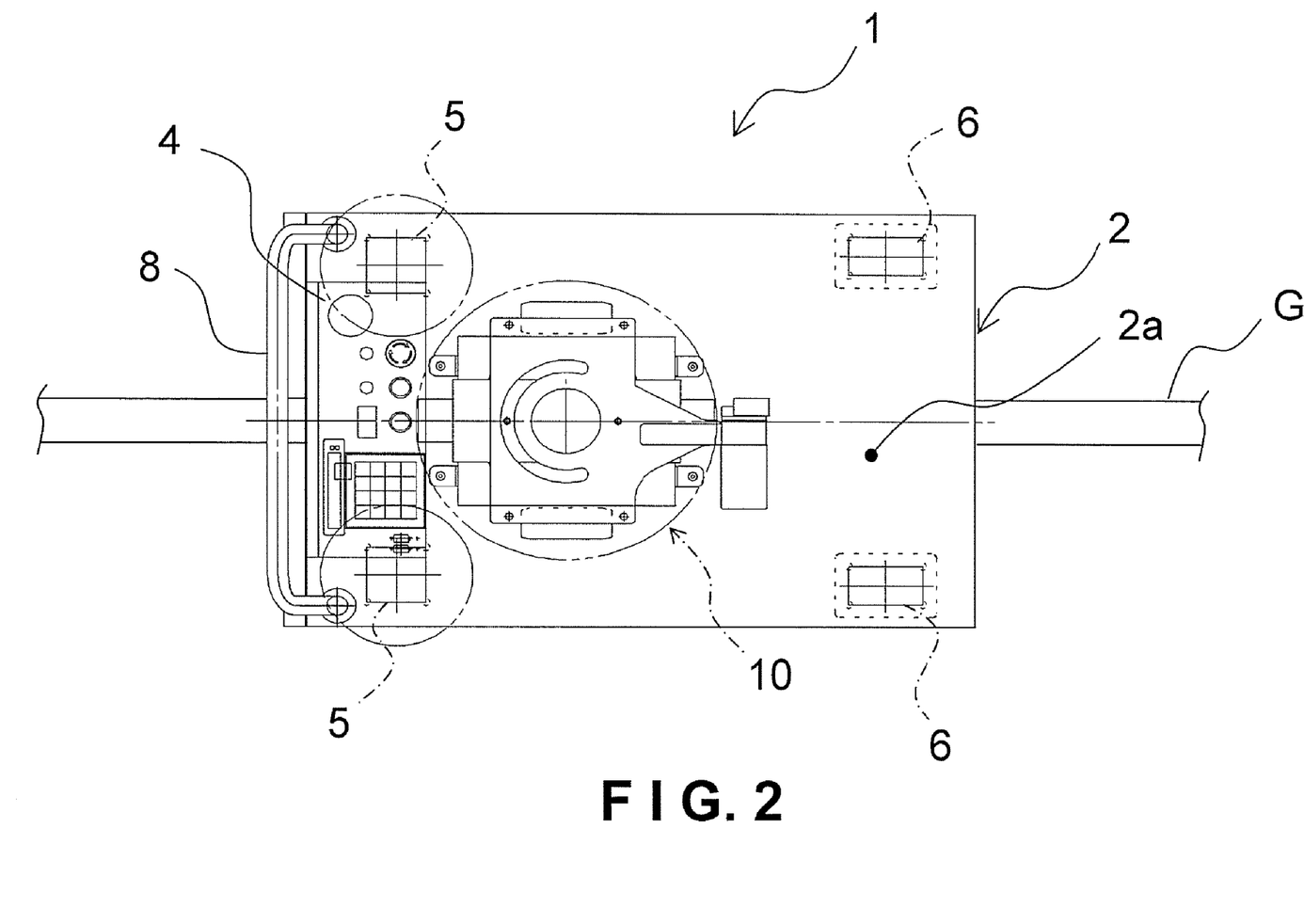
FIG. 2 is a top plan view of the automatic guided vehicle in accordance with the first embodiment.

As shown in FIGS. 1 and 2, the automatic guided vehicle 1 includes a cart body 2, a control device 4 and the drive device 10. The cart body 2 includes a platform plate 2a. The control device 4 is configured to control the overall operation of the automatic guided vehicle 1. The drive device 10 is mounted to a generally center portion of an undersurface of the platform plate 2a of the cart body 2. The control device 4 is operatively connected to the drive device 10 to control the drive device 10 so that the automatic guided vehicle 1 automatically moves along a guide strip G.

The automatic guided vehicle 1 also includes a pair of left and right casters 5 and a pair of left and right fixed wheels 6. The left and right casters 5 are mounted to a frontward portion (i.e., leftward in FIG. 1) of the undersurface of the platform plate 2a of the cart body 2. The left and right fixed wheels 6 are mounted to a rearward portion (i.e., rightward in FIG. 1) of the undersurface of the platform plate 2a of the cart body 2 The frontward and rearward directions are defined in terms of the movement direction of the automatic guided vehicle 1. The automatic guided vehicle 1 further includes a handle 8 mounted to a frontward portion of an upper surface of the platform plate 2a of the cart body 2 such that the automatic guided vehicle 1 can be pushed by an operator in order to move the automatic guided vehicle 1 manually.

The control device 4 includes a microprocessor built around a CPU (not shown). In addition to the CPU, the control device 4 includes a ROM (not shown) for storing control programs, a RAM (not shown) for temporarily storing data, and input and output ports (not shown). The control device 4 is configured to receive signals indicating motor rotational speeds of a motor M1 and a motor M2 (described later) from rotational speed sensors (not shown) mounted on the motors M1 and M2, a signal indicating a traveling position from a sensor GS (described later), and a command signal from a marker sensor MS though the input port.

Markers are provided near the guide strip G for indicating commands to change a driving mode among a forward mode, a reverse mode, a traverse mode, and a stop mode. The control device 4 is also configured to send drive signals to the motors M1 and M2 through the output port. The control device 4 is preferably arranged on a frontward portion of the upper surface of the platform plate 2a of the cart body 2 as shown in FIGS. 1 and 2.

Figure 3:
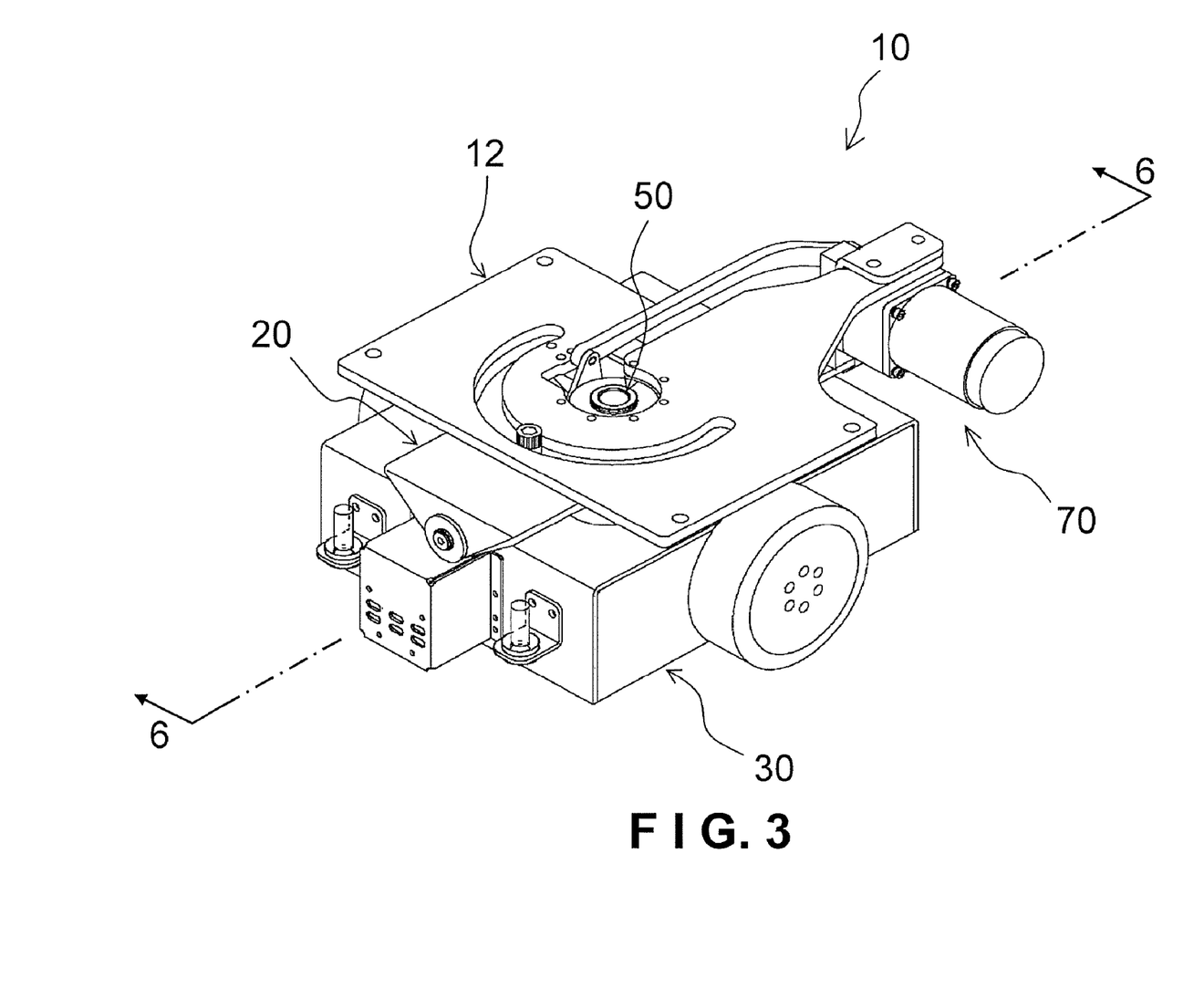
FIG. 3 is an enlarged perspective view of the automatic guided vehicle drive device in accordance with the first embodiment.
Figure 4:
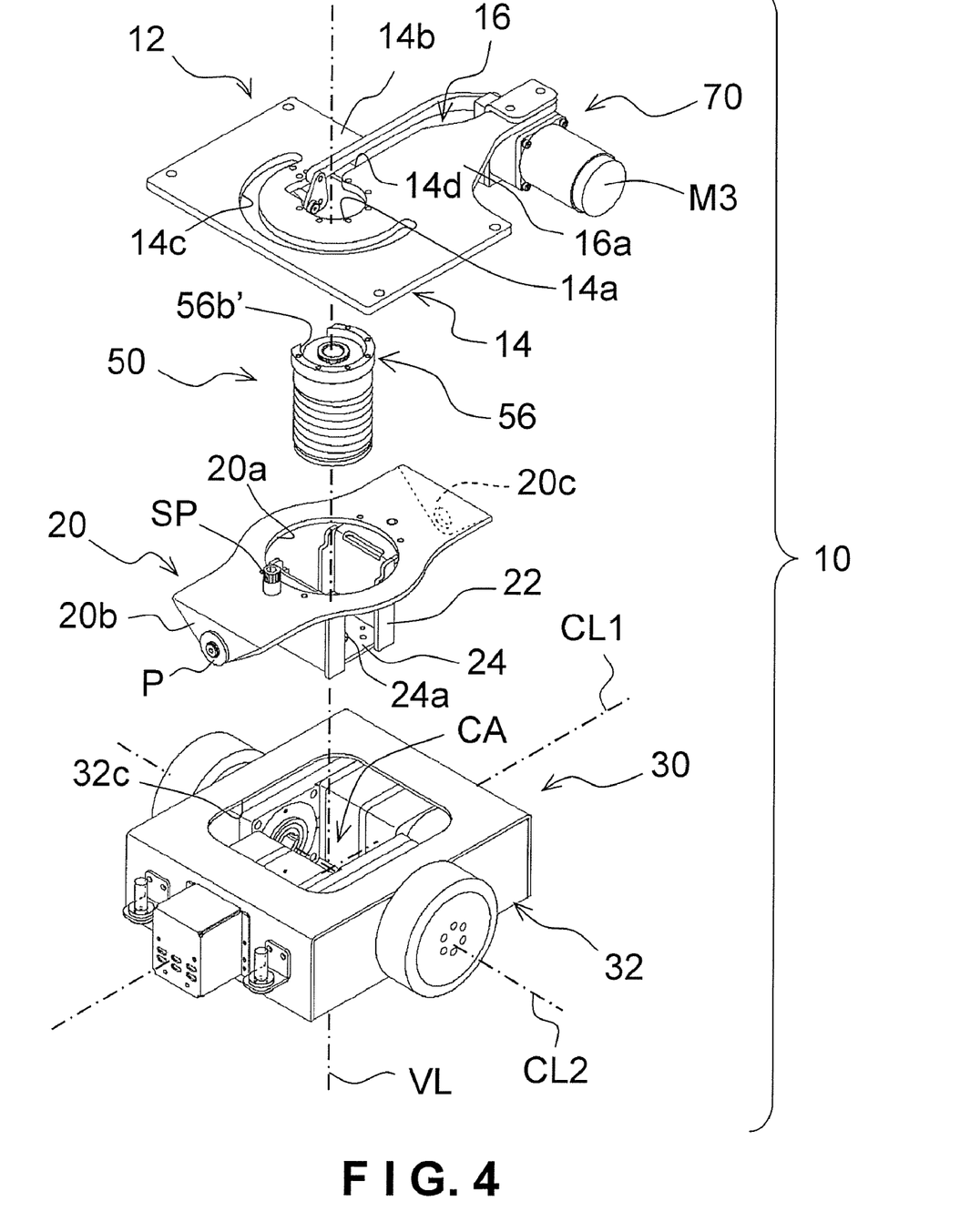
FIG. 4 is an exploded perspective view of the automatic guided vehicle drive device in accordance with the first embodiment.

FIG. 3 is an enlarged perspective view of the drive device 10 of the automatic guided vehicle 1, and FIG. 4 is an exploded perspective view of the drive device 10.

As shown in FIGS. 3 and 4, the drive device 10 includes a top plate member 12, a holding plate member 20, a drive unit 30, a turning shaft mechanism 50 and an elevating mechanism 70. The top plate member 12 is configured and arranged to be fastened securely to the undersurface of the platform plate 2a. The holding plate member 20 is coupled to the top plate member 12 through the turning shaft mechanism 50. The drive unit 30 is rockably (pivotally) held by the holding plate member 20. The elevating mechanism 70 is configured and arranged to selectively raise and lower the drive unit 30 with respect to the top plate member 12.

As shown in FIG. 4, the top plate member 12 includes a base portion 14 and a protruding portion 16. The base portion 14 defines a through hole 14a formed in a middle portion thereof. The protruding portion 16 is formed as a one-piece integral unit with the base portion 14 and protrudes from a long side portion 14b of the base portion 14. Thus, the top plate member 12 has a generally T-shaped external appearance as shown in FIG. 4. The base portion 14 also defines a circular arc-shaped hole 14c and a cut-out opening 14d. The circular arc-shaped hole 14c is formed around at least half of the external circumference of the through hole 14a as shown in FIG. 4. The cut-out opening 14d is formed to extend from the through hole 14a to a proximal portion 16a of the protruding portion 16.

As shown in FIG. 4, the holding plate member 20 defines a circular hole 20a formed in a middle portion thereof. The holding plate member 20 includes a pair of folded portions 20b and 20c formed by bending a frontward end portion and a rearward end portion of the holding plate member 20 vertically downward (the frontward and rearward directions being defined in terms of the movement direction of the automatic guided vehicle 1). A vertically upwardly protruding stop pin SP is securely mounted to the holding plate member 20 in a frontward position (leftward in FIG. 4) of the periphery of the circular hole 20a. In other words, the stopper pin SP is arranged in such a position that the stopper pin SP engages with the circular arc-shaped hole 14c of the top plate member 12 when the holding plate member 20 is coupled to the top plate member 12. As a result, the stopper pin SP of the holding plate member 20 serves to restrict the turning range of the drive unit 30, which is held by the holding plate member 20, with respect to the top plate member 12.

As shown in FIG. 4, a holder member 22 (a recessed portion) is mounted to an undersurface of the holding plate member 20. The holder member 22 has a bottomed shape that is open at the top thereof and has a flat bottom portion 24 at the bottom thereof. The holder member 22 is attached to the holding plate member 20 such that the open top thereof is aligned with the circular hole 20a as shown in FIG. 4. The flat bottom portion 24 of the holder member 22 defines an circular hole 24a (see FIG. 6) formed in a middle portion of the flat bottom portion 24.

Figure 5:
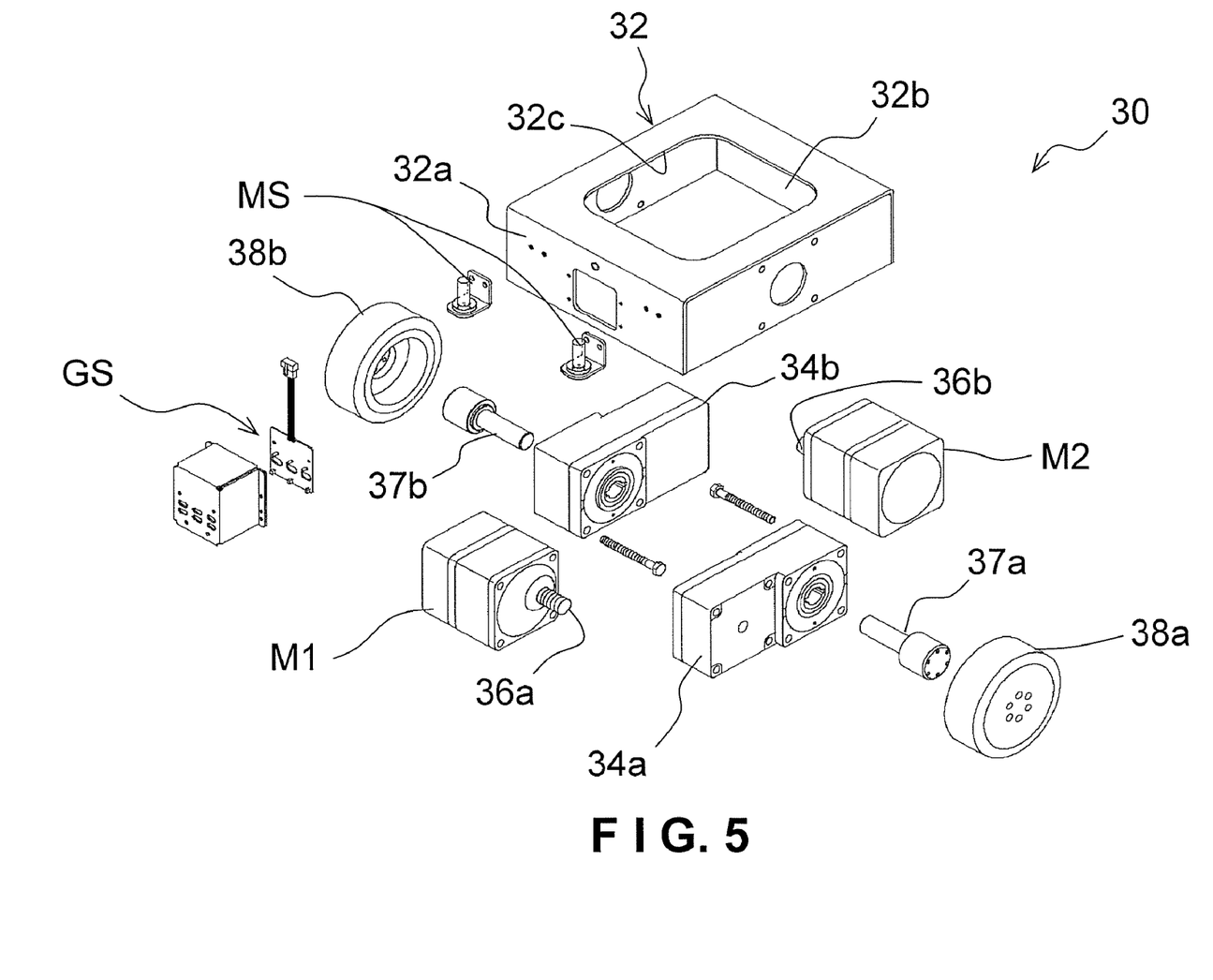
FIG. 5 is an exploded perspective view of a drive unit of the automatic guided vehicle drive device in accordance with the first embodiment.
Figure 6:
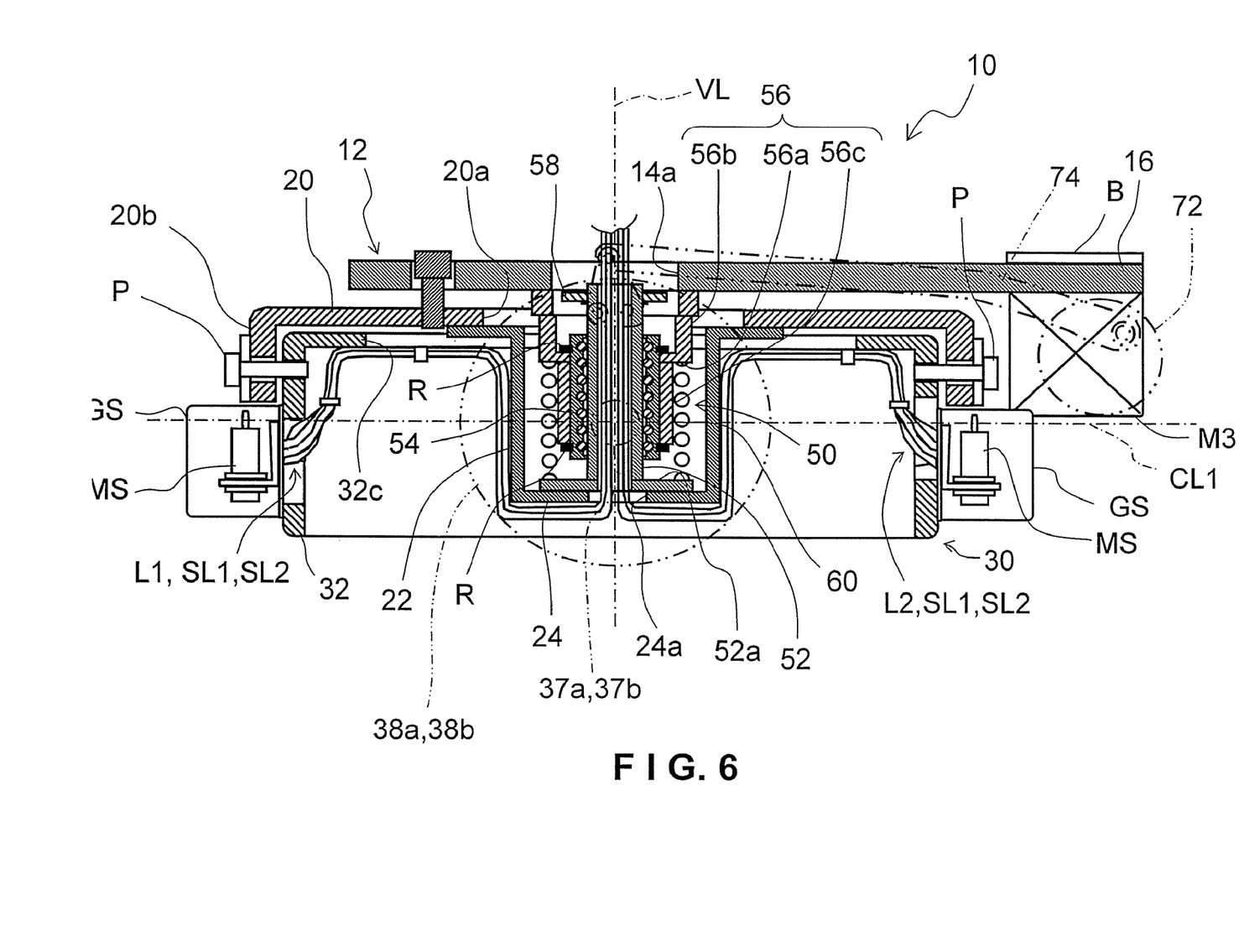
FIG. 6 is a cross sectional view of the automatic guided vehicle drive device as taken along a section line 6-6 in FIG. 3 in accordance with the first embodiment with some parts of the drive device being omitted for illustration purposes.
Figure 7:
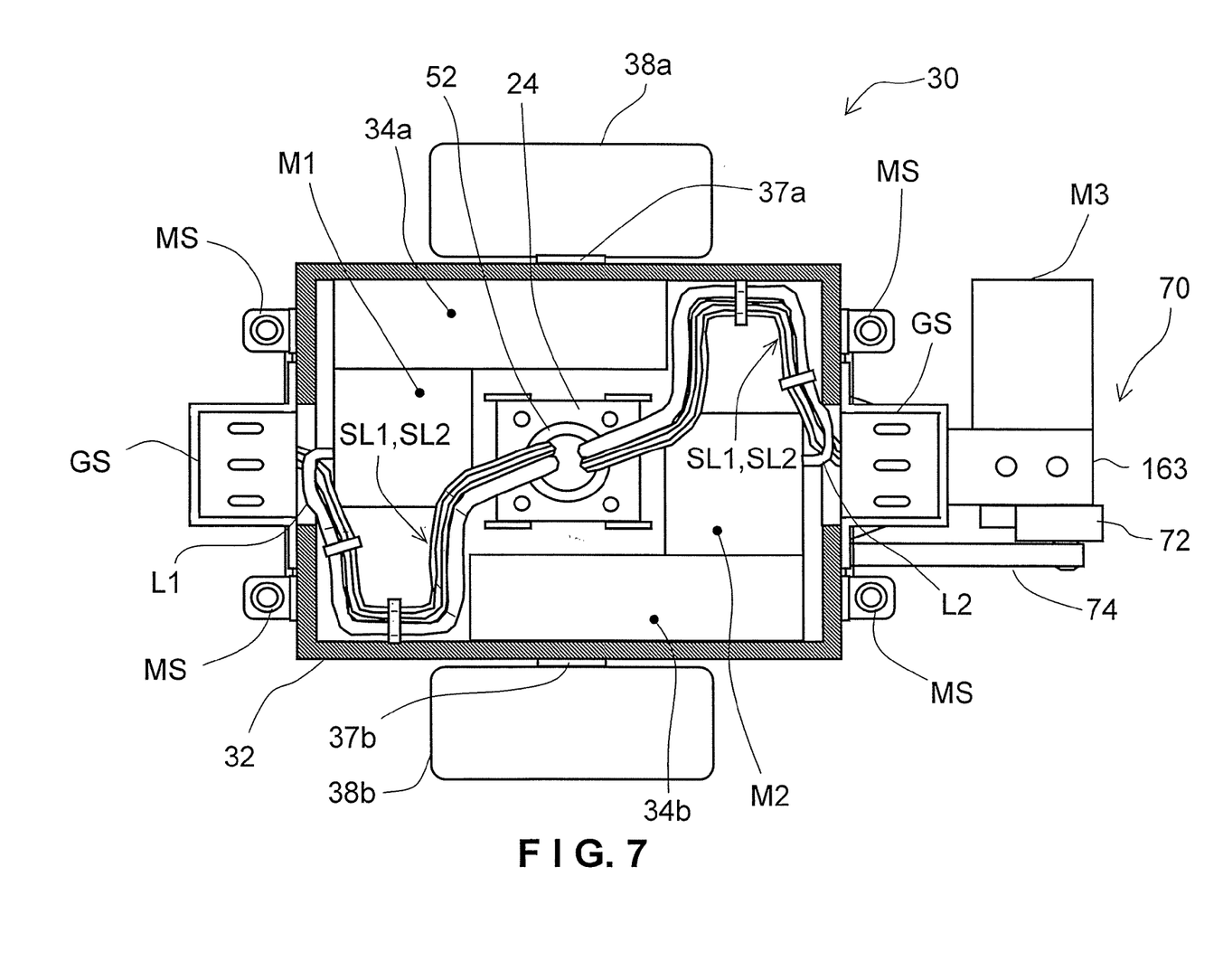
FIG. 7 is a bottom plan view of the automatic guided vehicle drive device illustrating an arrangement of power lines and signal lines in accordance with the first embodiment.

FIG. 5 is an exploded perspective view of the drive unit 30, FIG. 6 is a cross sectional view as taken along a section line 6-6 in FIG. 3 showing the main parts of the drive device 10, and FIG. 7 is a bottom plan view of the drive device 10.

As shown in FIGS. 5 to 7, the drive unit 30 includes a frame member 32, a pair of gear boxes 34a and 34b, a pair of motors M1 and M2 (an example of a drive mechanism), a left wheel axle 37a, a left wheel 38a, a right wheel axle 37b, a right wheel 38b, a pair of guide strip sensors GS and a plurality of marker sensors MS. The gear boxes 34a and 34b are fastened to the inside of the frame member 32 as shown in FIG. 7. The motor M1 is connected to the gear box 34a through a rotary shaft 36a, and the motor M2 is connected to the gear box 34b through a rotary shaft 36b. The left wheel axle 37a is connected to the gear box 34a, and the left wheel 38a is mounted to the left wheel axle 37a. The right wheel axle 37b is connected to the gear box 34b, and the right wheel 38b is mounted to the right wheel axle 37b. The left and right wheel axles 37a and 37b are coaxially arranged and spaced apart from each other in an axial direction. The guide strip sensors GS and the marker sensors MS are mounted to a front panel 32a and a rear panel 32b of the frame member 32 as shown in FIGS. 6 and 7. The guide strip sensors GS are configured and arranged to detect the guide strip G. The marker sensors MS are configured and arranged to detect the markers disposed near the guide strip G.

As shown in FIGS. 4 and 6, the folded portion 20b of the holding plate member 20 is connected to the front panel 32a of the frame member 32 with a rocking pin P and the folded portion 20c of the holding plate member 20 is connected to the rear panel 32b of the frame member 32 with a rocking pin P. In this way, the drive unit 30 is connected and held such that the drive unit 30 can rock or pivot freely in the space between the folded portion 20b and the folded portion 20c with respect to the movement direction of the automatic guided vehicle 1. As a result, the ability of the drive unit 30 to rock with respect to the holding plate member 20 is secured while also enabling the holding plate member 20 and the frame member 32 of the drive unit 30 to be connected in close proximity to each other as shown in FIG. 6.

As shown in FIGS. 4 and 7, the motors M1 and M2 and the gear boxes 34a and 34b are arranged inside the frame member 32 such that a central space CA is formed between the left wheel axle 37a and the right wheel axle 37b. When the drive unit 30 is connected to and held by the holding plate member 20, the holder member 22 attached to the holding plate member 20 fits through an opening 32c formed in a central portion of a top panel of the frame member 32 and is housed inside the central space CA. In such a state, as shown in FIGS. 4 and 6, the flat bottom portion 24 of the holder member 22 is arranged in a plane that includes a point on a vertical line VL passing through an intersection point between an axial centerline CL2 of the left and right wheel axles 37a and 37b and a middle line CL1 that is oriented in the movement direction and passes through an approximate middle position between the left and right wheel axles 37a and 37b. Therefore, a force acting in a direction of separating the drive unit 30 from the top plate member 12, i.e., a force acting to press both of the wheels 38a and 38b against the ground surface, is exerted through the holding plate member 20 at a position near a point on the vertical line VL passing through the intersection point between the axial centerline of the left and right wheel axles 37a and 37b and the middle line CL1 that is oriented in the movement direction and passes through an approximate middle position between the left and right wheel axles 37a and 37b. A "position near a point on a vertical line" as used herein is defined to be any position within a circular area that has a prescribed radius and is centered on a point lying on the vertical line VL. The point on the vertical line VL and the plane on which the flat bottom portion 24 lies are positioned vertically lower than the axial centerline CL2.

A power line L1 is electrically connected to the coil of each phase of the motor M1, and a power line L2 is electrically connected to the coil of each phase of the motor M2. The power lines L1 and L2 serve to connect the motors M1 and M2 to the control device 4, which is configured to drive and control the motors M1 and M2. The sensors GS and the marker sensors MS are connected to the control device 4 with signal lines SL1 and SL2.

As shown in FIG. 6, the turning shaft mechanism 50 includes a hollow turning shaft 52 (an example of a first shaft portion), a bearing member 54, a stepped cylindrical member 56 (an example of a second shaft portion), an annular plate member 58, and a coil spring 60. The hollow turning shaft 52 has a hollow space passing axially therethrough and has a flange portion 52a formed on a bottom end thereof. The bearing member 54 fits on the outside circumference of the turning shaft 52 such that the bearing member 54 rotates about and move axially along the turning shaft 52. The stepped cylindrical member 56 is fastened to an outside circumference of the bearing member 54 with snap rings R. The annular plate member 58 is attached to an upper end portion of the turning shaft 52. The coil spring 60 is arranged around an outside circumference of the stepped cylindrical member 56 and the turning shaft 52.

The flange portion 52a of the turning shaft mechanism 50 is fixedly coupled to the flat bottom portion 24 of the holder member 22 with a bolt or other fastening member or method (not shown), and the upper end surface of the stepped cylindrical member 56 is fixedly coupled to the top plate member 12 with a bolt or other fastening member or method (not shown). Thus, the top plate member 12 and the holding plate member 20 are operatively connected together by the turning shaft mechanism 50. The turning shaft 52 and the stepped cylindrical member 56 are attached to the flat bottom portion 24 of the holder member 22 and to the top plate member 12, respectively, such that the axial centerlines thereof are substantially coincident with the vertical line VL. Also, the coil spring 60 is arranged around the outside circumference of the stepped cylindrical member 56 and the turning shaft 52 such that the axial centerline thereof is substantially coincident with the vertical line VL.

As shown in FIG. 6, the stepped cylindrical member 56 has a large diameter cylindrical portion 56b and a small diameter cylindrical portion 56c with a step-shaped portion 56a being disposed therebetween. The large diameter cylindrical portion 56b is fixedly coupled to the top plate member 12 as discussed above. As shown in FIG. 4, the large diameter cylindrical portion 56b has a cut-out opening 56b' where a portion has been removed, and the large diameter cylindrical portion 56b is attached to the top plate member 12 such that the cut-out opening 56b' is oriented to correspond to the cut-out opening 14d of the top plate member 12.

As shown in FIG. 6, one end of the coil spring 60 abuts against the flange portion 52a of the turning shaft 52 and the other end abuts against the step-shaped portion 56a of the stepped cylindrical member 56 such that a spring force acts in a direction of separating the turning shaft 52 and the stepped cylindrical member 56 away from each other. The spring force of the coil spring 60 produces a grounding load acting to push the left wheel 38a and the right wheel 38b against the ground.

Accordingly, the turning shaft mechanism 50 is configured and arranged to support the drive unit 30 with respect to the top plate member 12 through the holding plate member 20 such that the drive unit 30 rotates freely about center axis of the turning shaft 52. Additionally, the turning shaft mechanism 50 serves to push the drive unit 30 vertically (straight) downward from the top plate member 12 through the holding plate member 20. Since the coil spring 60 is arranged such that the axial centerline thereof is substantially coincident with the vertical line VL, the grounding loads imparted to the left wheel 38a and the right wheel 38b are substantially uniform. As a result, the driving stability of the automatic guided vehicle can be improved.

Since most of the turning shaft mechanism 50 is housed inside the holder member 22 of the holding plate member 20 as shown in FIG. 6, the top plate member 12 and the holding plate member 20 are connected in relatively close proximity to each other. Moreover, since the holder member 22 is housed inside the central space CA formed inside the frame member 32 of the drive unit 30, the top plate member 12, the holding plate member 20, and the drive unit 30 are all connected in relatively closer proximity to one another.

Since the flat bottom portion 24 of the holder member 22 is disposed vertically lower than the axial centerline CL2 of the left and right wheel axles 37a and 37b, a relatively large portion of the turning shaft mechanism 50 is housed inside the holder member 22. Therefore, the top plate member 12 and holding plate member 20 are connected in relatively closer proximity to each other. As a result, the height dimension of the drive device 10 is reduced and the overall platform height of the automatic guided vehicle 1 can be reduced.

Since the coil spring 60 is arranged between the flange portion 52a of the turning shaft 52 and the step-shaped portion 56a of the stepped cylindrical member 56, i.e., around the outside circumference of the small diameter cylindrical portion 56c of the stepped cylindrical member 56 and the turning shaft 52, the spring diameter is made larger than if a coil spring was arranged inside the turning shaft 52. As a result, an axial length of the coil spring 60 is made shorter than if a coil spring was arranged inside the turning shaft 52 to obtain the same spring force because a larger linear region can be secured with a large spring diameter. Therefore, the axial length of the turning shaft mechanism 50 is made relatively short. As a result, the height dimension of the drive device 10 is reduced and the overall platform height of the automatic guided vehicle 1 is reduced.

FIG. 7 is a bottom plane view of the drive device 10 showing the arrangement of the power lines L1 and L2 and the signal lines SL1 and SL2.

As shown in FIGS. 6 and 7, the power lines L1 and L2 of the motors M1 and M2 and the signal lines SL1 and SL2 of the sensors GS and the marker sensors MS are bundled together inside the frame member 32 and inserted inside the hollow space of the turning shaft 52. The bundled lines are passed trough the inside of turning shaft 52 to the upper surface of the top plate member 12 and connected to the control device 4.

By passing the power lines L1 and L2 and the signal lines SL1 and SL2 through the inside of the turning shaft 52, the work of arranging and connecting the lines can be simplified. In other words, it is not necessary to consider rotation of the drive unit 30 with respect to the top plate member 12 when determining the layout and lengths of the power lines L1 and L2 and the signal lines SL1 and SL2.

Figure 8:
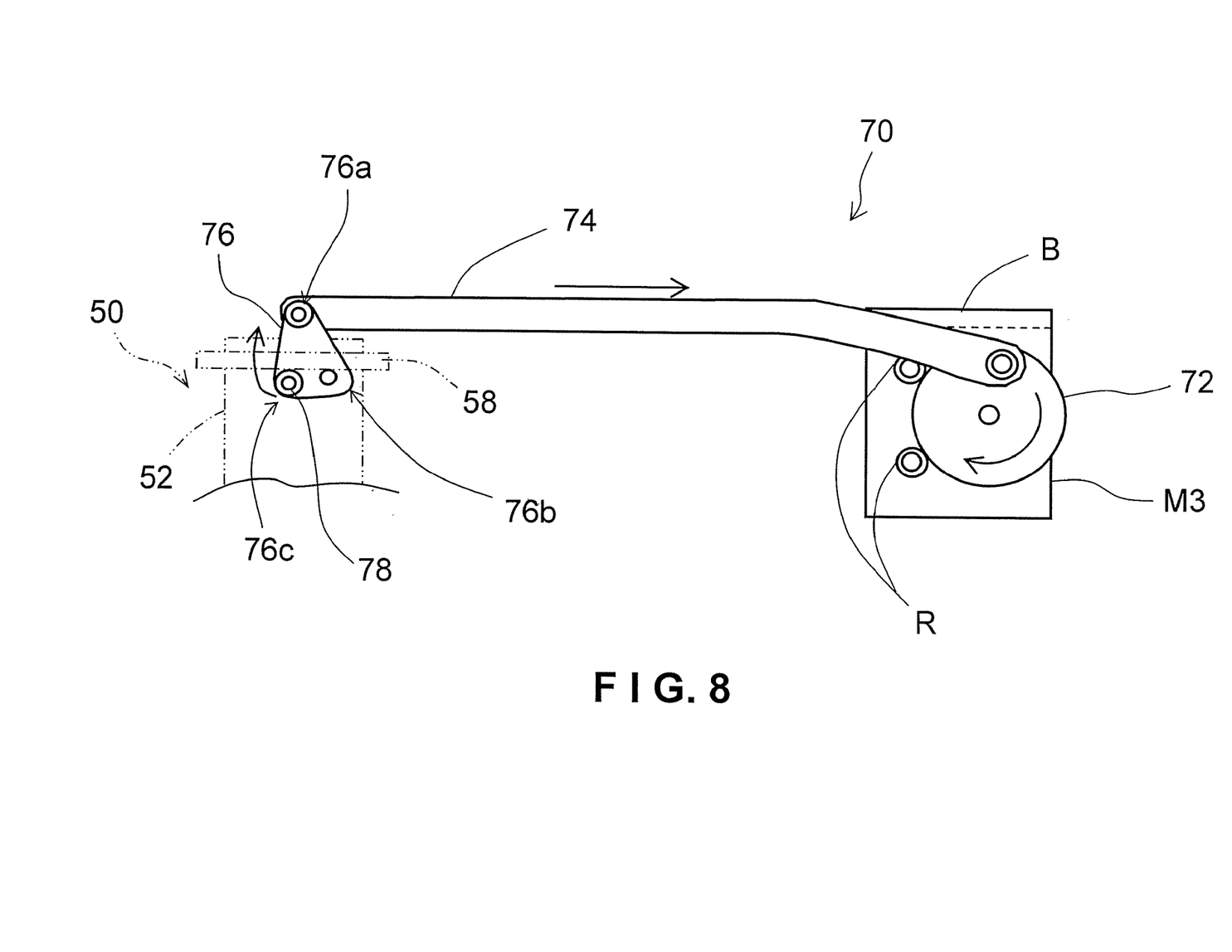
FIG. 8 is a schematic view of an elevating mechanism of the automatic guided vehicle drive device in accordance with the first embodiment.

FIG. 8 is a schematic view showing constituent features of the elevating mechanism 70.

As shown in FIG. 8, the elevating mechanism 70 includes an elevation motor M3, a cam follower 72, an elevation rod 74 and a lever member 76. The elevation motor M3 is configured to raise and lower the drive unit 30. The cam follower 72 is connected to a rotary shaft of the elevation motor M3. The elevation rod 74 is connected to the cam follower 72. The lever member 76 is connected to the elevator rod 74 and configured and arranged to engage with the plate member 58 of the turning shaft mechanism 50. Thus, the rotation of the elevation motor M3 is used to raise and lower the drive unit 30.

As shown in FIG. 6, the elevation motor M3 is arranged on a distal end of the protruding portion 16 of the top plate member 12. More specifically, the elevation motor M3 is mounted to an undersurface of the top plate member 12 with a bracket B so as to be arranged to a side of the drive unit 30. As a result, the elevation motor M3 can be prevented from increasing the height dimension of the drive unit 30.

As shown FIG. 8, the cam follower 72 is connected concentrically to the rotary shaft of the elevation motor M3, and the elevation rod 74 is connected in a position at a prescribed distance away from (radially outward from) the rotary shaft. Two roller members R attached to the bracket B prevent the cam follower 72 from leaning in a direction perpendicular to the rotary shaft of the elevation motor M3.

As shown in FIGS. 4 and 8, the elevator rod 74 is generally straight with a slight bend at an intermediate position closer to one end. The elevator rod 74 extends along the cut-out opening 14d formed in the top plate member 12 from the cam follower 72 to the through hole 14a of the top plate member 12 so as to follow along the cut-out opening 14d formed in the top plate member 12. When the cam follower 72 rotates, the elevation rod 74 rocks longitudinally (horizontally in FIG. 8). In other words, the elevation rod 74 works in conjunction with the cam follower 72 to convert rotational motion of the elevation motor M3 into generally horizontal or generally linear motion. Thus, the cam follower 72 and the elevation rod 74 constitutes a cam unit that converts a rotational motion of the elevation motor M3 into a generally linear motion. When the elevation rod 74 is rocked forward (leftward in FIGS. 4 and 8), i.e., toward the lever member 76, due to the rotation of the cam follower 72, at least a portion of the elevation rod 74 is disposed inside the cut-out opening 14d of the top plate member 12. As a result, an increase in the height dimension of the automatic guided vehicle 1 due to the rocking motion of the elevation rod 74 is suppressed.

As shown in FIG. 8, the lever member 76 is a plate having substantially the shape of an isosceles triangle. The apex portion 76a where the two sides of equal length intersect is pivotally connected to a tip end of the elevation rod 74, and one end portion 76b of the base side is supported on an L-shaped bracket (not shown) that is securely attached to the top plate member 12. Another end portion 76c of the base side is engaged with the plate member 58 of the turning shaft mechanism 50 through a ring member 78. In other words, the lever member 76 is a link member in which the apex portion 76a is a force input point, the end portion 76b of the base side is a fulcrum, and the other end portion 76c of the base side is an operating point. The ring member 78 and the plate member 58 of the turning shaft mechanism 50 are engaged through the cut-out opening 56b' formed in the large diameter cylindrical portion 56b of the stepped cylindrical member 56.

When the rotary shaft of the elevation motor M3 rotates, the cam follower 72 rotates and causes the elevation rod 74 to rock in a longitudinal direction that is a horizontal direction in FIG. 8. The rocking movement of the elevation rod 74 causes the lever member 76 to rock and move the turning shaft 52 of the turning shaft mechanism 50 generally vertically upward against the spring force of the coil spring 60. More specifically, the rotation of the elevation motor M3 is converted into generally vertical motion in accordance with a lever ratio between the distance from the apex portion 76a of the lever member 76 to the end portion 76b of the base side and the distance from the end portion 76b of the base side to the other end portion 76c of the base side, and the drive unit 30 is separated from the ground surface through the holding plate member 20 on which the turning shaft 52 is mounted. In this way, the elevating mechanism 70 is arranged to lift the drive unit 30 vertically upward and separate the drive unit 30 from the ground surface by a relatively large distance while suppressing an increase in the height dimension of the elevating mechanism 70.

In the drive device 10 for the automatic guided vehicle 1 according to the first embodiment described above, the drive unit 30 is pivotally held by the holding plate member 20 by the rocking pins P having axial centerlines that are parallel to the movement direction of the automatic guided vehicle 1. The holding plate member 20 is connected to the top plate member 12 (which is configured and arranged to engage with the cart body 2) through the turning shaft mechanism 50 arranged between the left wheel axle 37a and the right wheel axle 37b. More specifically, with the drive device 10 of the first embodiment, it is not necessary to provide an aligning bearing or a rocking motion limiting plate because rocking or pivoting of the drive unit 30 about the movement direction is accomplished independently of the turning shaft mechanism 50 that turnably supports the drive unit 30 and that exerts a spring force against the drive unit 30. As a result, the height dimension of the automatic guided vehicle 1 is reduced without being restricted by such components as an aligning bearing and a rocking motion limiting plate. Additionally, since the coil spring 60 is arranged such that the axial centerline thereof is substantially coincident with the vertical line VL, the grounding loads imparted to the left wheel 38a and the right wheel 38b are substantially uniform and the driving stability can be improved.

In the drive device 10 for the automatic guided vehicle 1 according to the first embodiment, the holder member 22 is arranged inside the central space CA formed inside the frame member 32 of the drive unit 30 such that the flat bottom portion 24 of the holder member 22 is arranged in a plane that includes a point on the vertical line VL passing through the intersection point between the axial centerline CL2 of the left and right wheel axles 37a and 37b and the middle line CL1 that is oriented in the movement direction and passes through the approximate middle position between the left and right wheel axles 37a and 37b. The point on the vertical line VL and the plane on which the flat bottom portion 24 lies are positioned vertically lower than the axial centerline CL2 of the left and right wheel axles 37a and 37b. Thus, most of the turning shaft mechanism 50 is housed inside the frame member 32 as shown in FIG. 6. As a result, the top plate member 12, the holding plate member 20, and the drive unit 30 are connected in relatively closer proximity to one another and the height dimension of the drive device 10 is reduced.

In the automatic guided vehicle 1 according to the first embodiment, the elevating mechanism 70 has the elevation motor M3 arranged to a side of the drive unit 30 and rotational motion of the elevation motor M3 is converted into horizontal motion by the cam follower 72 and the elevation rod 74. The horizontal motion is then converted into vertical motion of the drive unit 30 by the lever member 76. As a result, an increase in the height dimension of the elevating mechanism 70 is suppressed. Additionally, when the elevation rod 74 is rocked forward (leftward in FIGS. 2 and 8), i.e., when the drive unit 30 is lowered, due to rotation of the cam follower 72, at least a portion of the elevation rod 74 is disposed inside the cut-out opening 14d of the top plate member 12. As a result, an increase in the height dimension of the automatic guided vehicle 1 due to the rocking motion of the elevation rod 74 is suppressed. Also, since the elevating mechanism 70 is arranged to lift the drive unit 30 vertically upward, the drive unit 30 can be separated from the ground surface by a relatively large distance while suppressing an increase in the height dimension of the elevating mechanism 70.

With the drive device 10 for the automatic guided vehicle 1 according to the first embodiment, the weight of the automatic guided vehicle 1 is reduced because the turning shaft 52 mounted to the flat bottom portion 24 of the holder member 22 and configured to protrude vertically upward is hollow. Additionally, since the power lines L1 and L2 of the motors M1 and M2 and the signal lines SL1 and SL2 of the sensors GS and the marker sensors MS are arranged to pass through the inside of the turning shaft 52, the work of arranging and connecting the lines is simplified. In other words, it is not necessary to consider rotation of the drive unit 30 with respect to the top plate member 12 when determining the layout and lengths of the power lines L1 and L2 and the signal lines SL1 and SL2.

Although in the drive device 10 for the automatic guided vehicle 1 according to the first embodiment the holder member 22 mounted to an undersurface of the holding plate member 20 is arranged such that the flat bottom portion 24 of the holder member 22 is arranged in a plane that includes a point on the vertical line VL that is lower than the axial centerline CL2, it is also acceptable for the flat bottom portion 24 to lie in a plane that contains a point on the vertical line VL that is at the same height as the axial centerline CL2 or a point on the vertical line VL that is vertically higher than the axial centerline CL2.

In the drive device 10 for the automatic guided vehicle 1 according to the first embodiment, the turning shaft mechanism 50 is configured to use the spring force of the coil spring 60 arranged between the flange portion 52a of the turning shaft 52 and the step-shaped portion 56a of the stepped cylindrical member 56 to exert a force against a central portion between the two wheel axles 37a and 37b so as to push both of the wheels 38a and 38b against the ground surface. It is also acceptable for the turning shaft mechanism 50 to be configured to use a cylinder, solenoid, or the like to generate a force against a central portion of the wheel axles 37a and 37b (in order to push both of the wheels 38a and 38b against the ground surface) using hydraulic pressure, air pressure, or electromagnetic force.

Although in the drive device 10 for the automatic guided vehicle 1 according to the first embodiment, the holder member 22 is attached to an undersurface of the holding plate member 20 using bolts or other fastening member or method, it is acceptable for the holder member 22 to be formed as a one-piece integral unit together with the holding plate member 20.

Although the grounding loads applied to the left wheel 38a and the right wheel 38b are generated with the spring force of the coil spring 60, it is also acceptable for the turning shaft mechanism 50 to be configured to use a cylinder, solenoid, or the like to generate the grounding loads applied to the left wheel 38a and the right wheel 38b using hydraulic pressure, air pressure, or electromagnetic force as discussed above.

Although in the drive device 10 for the automatic guided vehicle 1 according to the first embodiment, the stepped cylindrical member 56 is attached to an undersurface of the top plate member 12 using bolts or other fastening member of method, it is acceptable for the stepped cylindrical member 56 to be formed as a one-piece integral unit together with the top plate member 12.

Although in the drive device 10 for the automatic guided vehicle 1 according to the first embodiment, the turning shaft mechanism 50 is configured such that the turning shaft 52 rotatably and slidably fits inside the stepped cylindrical member 56, it is acceptable for a stepped cylindrical member to be rotatably and slidably fitted into the inside of a turning shaft.

Although in the drive device 10 according to the first embodiment the turning shaft 52 is formed such that the inside thereof is hollow, it is acceptable for the inside of the turning shaft 52 not to be hollow.

Second Embodiment

Figure 9:
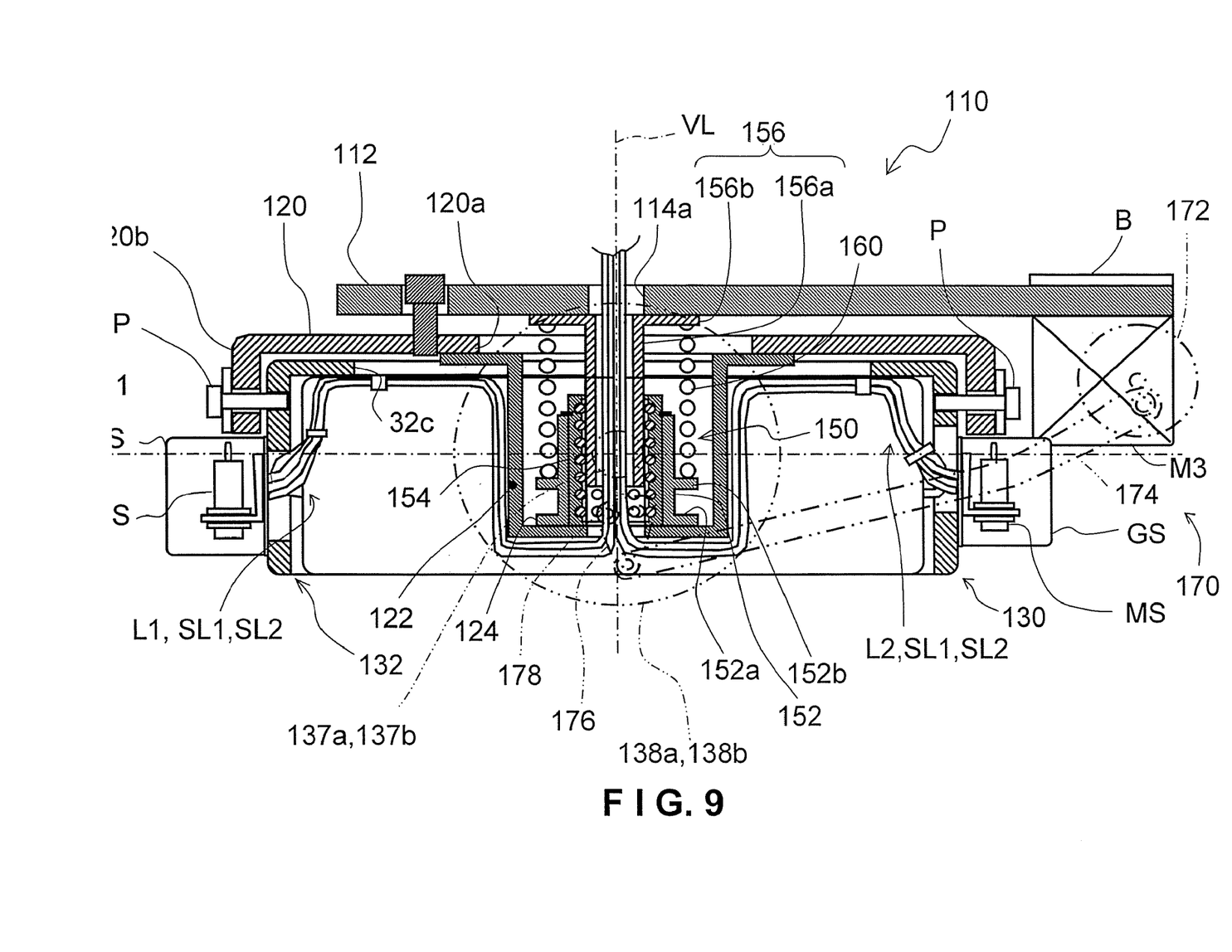
FIG. 9 is a cross sectional view of an automatic guided vehicle drive device in accordance with a second embodiment with some parts of the drive device being omitted for illustration purposes.

Referring now to FIG. 9, a drive device 110 (an automatic guided vehicle drive device) in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

FIG. 9 is a cross sectional schematic view of the drive device 110 in accordance with the second embodiment with some parts thereof being omitted for illustration purposes. The drive device 110 of the second embodiment is basically the same as the drive device 10 of the first embodiment except for structures and arrangements of a turning shaft mechanism 150 and an elevating mechanism 170.

As shown in FIG. 9, the turning shaft mechanism 150 of second embodiment includes a turning shaft 152 (an example of the first shaft portion), a bearing member 154, a cylindrical member 156 (an example of the second shaft portion), and a coil spring 160. The turning shaft 152 has a first flange portion 152a formed on a bottom end thereof and a second flange portion 152b formed in a position located a prescribed distance toward a top end from the first flange portion 152a. The bearing member 154 is fixedly coupled to an internal circumference of the turning shaft 152. The cylindrical member 156 has a hollow cylindrical portion 156a that rotatably and slidably fits in the bearing member 154 such that the cylindrical member 156 rotates and moves axially with respect to the bearing member 154 and a flange portion 156b formed on a top end portion of the hollow cylindrical portion 156a. The coil spring 160 is arranged between the second flange portion 152b of the turning shaft 152 and the flange portion 156b of the cylindrical member 156. The coil spring 160 exerts a force in a direction of separating the turning shaft 152 and the cylindrical member 156 apart from each other. The first flange portion 152a is fastened to a flat bottom portion 124 of a holder member 122 of a holding plate member 120 with bolts or other fastening member or method (not shown). The flange portion 156b is fastened to a top plate member 112 with bolts or other fastening member or method (not shown). Therefore, the top plate member 112 and the holding plate 120 are operatively coupled through the turning shaft mechanism 150.

The elevating mechanism 170 has a lever member 176 (which is similar to the lever member 76 of the first embodiment) configured to engage with an undersurface of the second flange portion 152b of the turning shaft mechanism 150 through a ring member 178. When the rotary shaft of the elevation motor M3 rotates, a cam follower 172 rotates and an elevation rod 174 converts the rotational motion of the cam follower 172 into a horizontal motion in a longitudinal direction (horizontal direction in FIG. 9). The horizontal movement of the elevation rod 174 causes the lever member 176 to rock and move the turning shaft 152 of the turning shaft mechanism 150 vertically upward against the spring force of the coil spring 160. In other words, the rotation of the elevation motor M3 is converted into vertical motion in accordance with a lever ratio of the lever member 176 and the drive unit 130 is separated from the ground surface through the holding plate 120 on which the turning shaft 152 is mounted.

The drive device 110 of the second embodiment exhibits the same effects as the drive device 10 of the first embodiment, e.g., an effect of enabling the height of the automatic guided vehicle to be reduced, an effect of enabling the driving stability to be improved, and an effect of enabling the drive unit 130 to be lifted vertically upward such that the drive unit 130 separates from the ground surface by a large distance while suppressing an increase in the height dimension thereof. Additionally, since the elevation rod 174 is housed inside the frame member 132, an increase in the height dimension can be suppressed even further without causing the elevation rod 174 to protrude higher than the top plate member 12.

Although in the drive device 10 and 110 according to the first and second embodiments, the coil spring 60 or 160 are arranged on the external circumferential surface of the stepped cylindrical member 56 or the turning shaft 152, it is also acceptable for the coil spring 60 or 160 to be arranged on the internal circumferential surface of the turning shaft 52 or the cylindrical member 156.

In the drive device 10 and 110 according to the first and second embodiments, each of the turning shaft 52 or 152 is fixedly coupled to the flat bottom portion 24 or 124 of the holder member 22 or 122 such that a portion thereof is housed inside the holder member 22 or 122. However, it is also acceptable if the turning shaft 52 or 152 is not housed inside the holder member 22 or 122.

Third Embodiment

Figure 10:
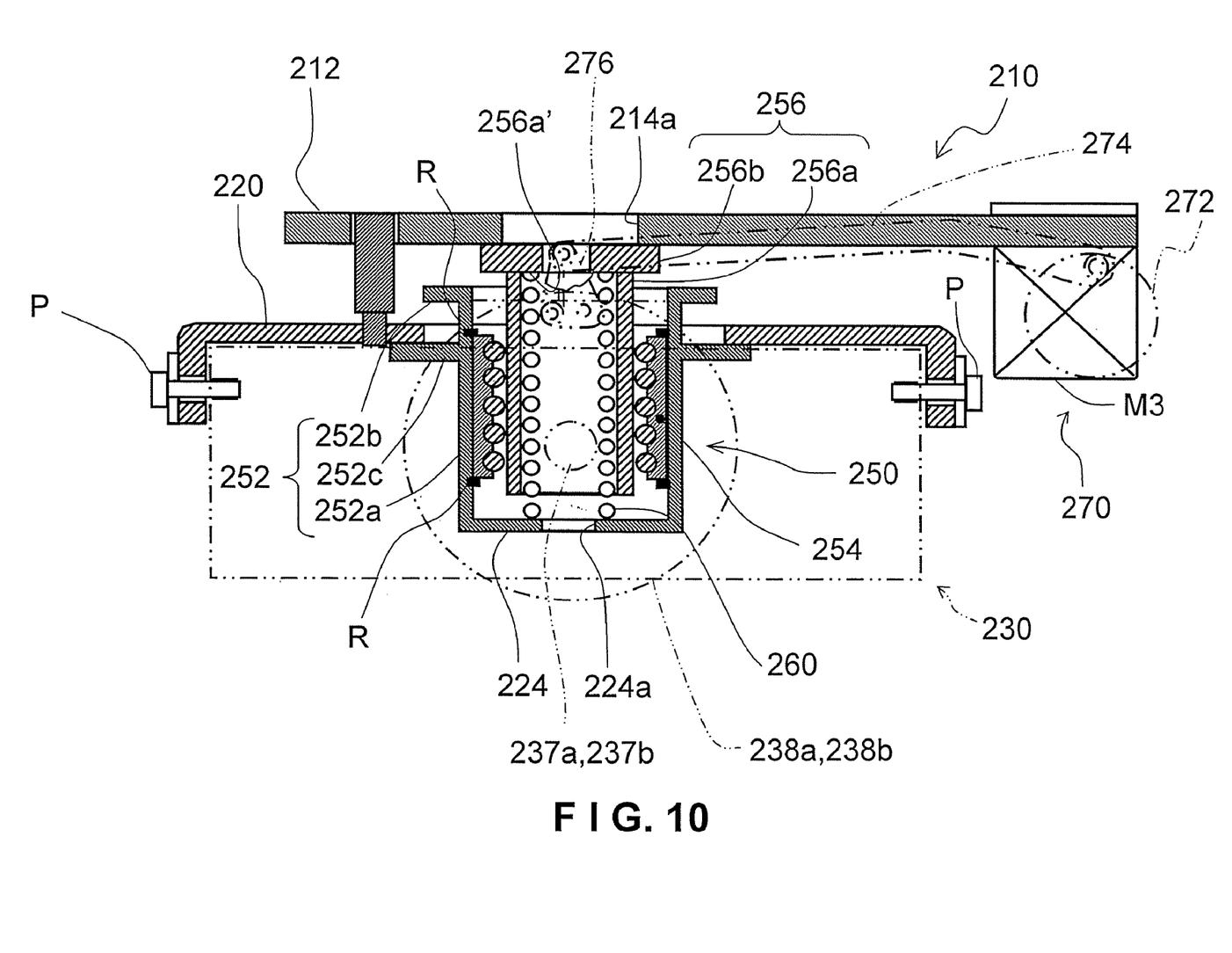
FIG. 10 is a cross sectional view of an automatic guided vehicle drive device in accordance with a third embodiment with some parts of the drive device being omitted for illustration purposes.

Referring now to FIG. 10, a drive device 210 (an automatic guided vehicle drive device) in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

FIG. 10 is a schematic cross sectional view of the drive device 210 with some components being omitted for illustration purposes. The drive device 210 of the third embodiment is basically the same as the drive device 10 of the first embodiment except for structures of a turning shaft mechanism 250 and a holding plate member 220.

As shown in FIG. 10, the turning shaft mechanism 250 of the third embodiment includes a turning shaft 252 (an example of the first shaft portion), a bearing member 254, a cylindrical member 256 (an example of the second shaft portion), and a coil spring 260. The turning shaft 252 has a bottomed main body portion 252a, a first flange portion 252b, and a second flange portion 252c. The bottomed main body portion 252a is open at a top end and has a flat bottom portion at a bottom end. The first flange portion 252b is formed on the external circumference of the top end of the main body portion 252a, and the second flange portion 252c is formed on the external circumferential surface of the main body portion 252a in a position located a prescribed distance toward the bottom end from the first flange portion 252b. The bearing member 254 is fixedly coupled to an internal circumferential surface of the turning shaft 252 with a snap ring R. The cylindrical member 256 has a hollow cylindrical portion 256a that rotatably and slidably fits in the bearing member 254 such that the cylindrical member 256 rotates and moves axially with respect to the bearing member 254. The cylindrical member 256 also has a flange portion 256b formed on the top end portion of the hollow cylindrical portion 256a. The coil spring 260 is arranged with a top end thereof abutting against an inside step-shaped part 256a' of the hollow cylindrical portion 256a and a bottom end thereof abutting against the flat bottom portion 224 of the turning shaft 252 such that the coil spring 260 exerts a force in a direction of separating the turning shaft 252 and the cylindrical member 256 apart from each other. The second flange portion 252c is fastened to a flat bottom portion of a holder member 222 of a holding plate member 220 with bolts or other fastening member of method (not shown), and the flange portion 256b is fastened to a top plate member 212 with bolts or other fastening member or method (not shown). Therefore, the top plate member 212 and the holding plate member 220 are operatively coupled through the turning shaft mechanism 250.

An elevating mechanism 270 has a lever member 276 configured to engage with an undersurface of the first flange portion 252b of the turning shaft mechanism 250 through a ring member 278. When the rotary shaft of the elevation motor M3 rotates, a cam follower 272 rotates and an elevation rod 274 converts the rotational motion of the cam follower 272 into a horizontal motion in a longitudinal direction (horizontal direction in FIG. 10). The horizontal movement of the elevation rod 274 causes the lever member 276 to rock and move the turning shaft 252 of the turning shaft mechanism 250 vertically upward against the spring force of the coil spring 260. In other words, the rotation of the elevation motor M3 is converted into vertical motion in accordance with a lever ratio of the lever member 276 and a drive unit 230 is separated from the ground surface through the holding plate member 220 on which the turning shaft 252 is mounted.

The drive device 210 of the third embodiment exhibits the same effects as the automatic guided vehicle 1 of the embodiment, e.g., an effect of enabling the height of the automatic guided vehicle to be reduced, an effect of enabling the driving stability to be improved, and an effect of enabling the drive unit 230 to be lifted vertically upward such that the drive unit 230 separates from the ground surface by a large distance while suppressing an increase in the height dimension thereof.

With the drive device 10, 110 and 210 according to the above embodiments, rocking of the drive unit 30, 130 or 230 about the movement direction can be accomplished independently of the turning shaft mechanism 50, 150 or 250 that turnably supports the drive unit 30, 130 or 230 while exerting a force against the drive unit 30, 130 or 230. Thus, it is not necessary to provide an aligning bearing or a rocking motion limiting plate in the drive device 10, 110 or 210 according to the above embodiments. As a result, the height dimension of the automatic guided vehicle 1 can be reduced without being restricted by such components as an aligning bearing and a rocking motion limiting plate. In addition to being able to both turn and rock the drive unit 30, 130 or 230, the driving performance of the automatic guided vehicle 1 is not degraded because a force acting in a direction of separating the drive unit 30, 130 or 230 from the top plate member 12, 112 or 212, i.e., a force acting to press both of the wheels 38a and 38b against the ground surface, is exerted through the holding plate member 20, 120 or 220 at a position near a point on the vertical line VL passing through the intersection point between the axial centerline of the left and right wheel axles 37a and 37b and the middle line CL 1 that is oriented in the movement direction and passes through an approximate middle position between the left and right wheel axles 37a and 37b.

In the drive device 10, 110 and 210 according to the above embodiments, the turning shaft mechanism 50, 150 or 250 is configured to exert the force near a point on the vertical line VL that is positioned vertically lower than the axial centerline CL2. Since the force exerted against the drive unit 30, 130 or 230 through the holding plate member 20, 120 or 220 can be exerted at a lower point, the top plate member 12, 112 or 212 and the holding plate member 20, 120 or 220 are arranged relatively closer together. As a result, the height of the automatic guided vehicle 1 can be reduced.

In the drive devices 10 and 110 according to the first and second embodiments, the turning shaft mechanism 50 or 150 has a first shaft portion (the turning shaft 52 or 152) that is connected to the holding plate member 20 or 120 and protrudes vertically upward from a position near the point on the vertical line VL, a second shaft portion (the cylindrical member 56 or 156) that is provided on the top plate and protrudes vertically downward from a position corresponding to the first shaft portion, and a spring member (the coil spring 60 or 160) that is configured to exert the force by undergoing elastic deformation while being guided by the first shaft portion and/or the second shaft portion. Additionally, the turning shaft mechanism 50 or 150 turnably supports the drive unit 30 or 130 with respect to the top plate member 12 or 112 through the holding plate member 20 or 120 by rotatably and slidably fitting together the first shaft portion and the second shaft portion and to exert a spring force as the force against the drive unit 30 or 130 through the holding plate. In this way, the drive unit 30 or 130 can be turnably supported with respect to the top plate member 12 or 112 through the holding plate member 20 or 120 and a structure for exerting a force against the drive unit 30 or 130 through the holding plate member 20 or 120 in a direction of separating the drive unit 30 or 130 from the top plate member 12 or 112 can be secured in a simple manner.

In the drive device 10, 110 and 210 according to the above embodiments, the holding plate member 20 or 120 can be made to have a cylindrical recessed portion (the holder member 22 or 122) in a position near the point on the vertical line VL. The cylindrical recessed portion is recessed in a vertically downward direction. Additionally, the turning shaft mechanism 50 or 150 exerts the spring force either directly or indirectly against a flat bottom portion 24 or 124 of the cylindrical recessed portion. In this way, the point where the spring force acts on the drive unit 30 or 130 through the holding plate member 20 or 120 can be set to be lower than an upper surface of the holding plate member 20 or 120 and, thus, the top plate member 12 or 112 and the holding plate member 20 or 120 can be arranged in close proximity to each other. As a result, the height of the automatic guided vehicle 1 can be reduced.

In the drive device 10, 110 and 210 according to the above embodiments, the flat bottom portion 24 or 124 of the cylindrical recessed portion or the flat bottom portion 224 of the turning shaft 252 is provided in a position that is vertically lower than the axial centerline CL2. Since the point where the spring force is exerted against the drive unit 30, 130 or 230 through the holding plate member 20, 120 or 220 can be set to a lower position, the top plate member 12, 112 or 212 and the holding plate member 20, 120 or 220 are arranged relatively closer together. As a result, the height of the automatic guided vehicle 1 can be reduced further.

In the drive device 10, 110 and 210 according to the above embodiments, at least a portion of the first shaft portion is housed in the cylindrical recessed portion. By housing at least a portion of the first shaft portion in the cylindrical recessed portion, the amount by which the first shaft portion protrudes from the upper surface of the holding plate can be suppressed. As a result, the top plate member 12, 112 or 212 and the holding plate member 20, 120 or 220 are arranged in relatively closer proximity to each other and the height of the automatic guided vehicle 1 is reduced even further.

In the drive device 10, 110 and 210 according to the above embodiments, the spring member 60, 160 or 260 is a coil spring that is arranged on an outside of the first shaft portion and/or the second shaft portion so as to be guided along the first shaft portion and/or the second shaft portion. In this way, the radial dimension of the spring member 60, 160 or 260 is increased and such that same spring force can be generated with a spring having a shorter axial dimension than with a spring having a smaller radial dimension. As a result, the top plate member 12, 112 or 212 and the holding plate member 20, 120 or 220 can be arranged in relatively closer proximity to each other and the height of the automatic guided vehicle 1 is reduced even further.

In the drive device 10, 110 and 210 according to the above embodiments, the first shaft portion and/or the second shaft portion are/is configured to have a hollow space passing axially there-through. In this way, the weight of the automatic guided vehicle 1 is relatively reduced.

In the drive device 10, 110 and 210 according to the above embodiments, the drive unit 30, 130 or 230 has an electric motor M1 or M2 as the drive device and an electric power line L1 or L2 for exchanging electric power between the electric motor M1 or M2 and a control device 4 configured to drive and control the electric motor M1 or M2. The electric power line L1 or L2 is passed through the first shaft portion and/or the second shaft portion. In this way, the need to consider rotation of the drive unit 30, 130 or 230 with respect to the top plate member 12, 112 or 212 when determining the layout of the power lines L1 and L2 can be eliminated. In other words, it is not necessary to make the power lines L1 and L2 longer or to arrange the power lines L1 and L2 in a particular manner in order to accommodate turning of the drive unit 30, 130 or 230.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of an automatic guided vehicle equipped with the present invention. Accordingly, these terms, as utilized to describe the present invention should be interpreted relative to a vehicle equipped with the present invention.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An automatic guided vehicle drive device comprising:
a top plate member configured and arranged to be attached to a cart body of a vehicle;
a drive unit having a left wheel axle attached to a left wheel and a right wheel axle attached to a right wheel with the left and right wheel axles being coaxially arranged and spaced apart from each other in an axial direction, and a drive mechanism operatively coupled to the left and right wheel axles to rotate the left and right wheels;
a holding plate member operatively coupled between the top plate member and the drive unit to pivotally hold the drive unit with respect to a movement direction of the vehicle; and
a turning shaft mechanism operatively coupled between the top plate member and the holding plate member to turnably support the drive unit with respect to the top plate member via the holding plate member about a vertical line passing through an intersection point between an axial centerline of the left and right wheel axles and a middle line that is oriented in the movement direction and passes through an approximate middle position between the left and right wheel axles, the turning shaft mechanism exerting a biasing force along the vertical line in a direction of separating the drive unit from the top plate member via the holding plate member.

2. The automatic guided vehicle drive device recited in claim 1, wherein
the turning shaft mechanism exerts the biasing force on the holding plate member at a position that is vertically lower than the axial centerline of the left and right wheel axles.

3. The automatic guided vehicle drive device recited in claim 1, wherein
the turning shaft mechanism includes
a first shaft portion connected to the holding plate member,
a second shaft portion connected the top plate member, the second shaft portion being rotatably and slidably coupled to the first shaft portion so that the drive unit is turnably supported with respect to the top plate member via the holding plate member, and
a spring member guided along at least one of the first and second shaft portions to exert the biasing force by elastic deformation.

4. The automatic guided vehicle drive device recited in claim 3, wherein
the holding plate member has a recessed portion disposed along the vertical line, the recessed portion being recessed in a vertically downward direction, and
the turning shaft mechanism exerts the biasing force against a bottom part of the recessed portion of the holding plate member at a position near a point on the vertical line.

5. The automatic guided vehicle drive device recited in claim 4, wherein
the bottom part of the recessed portion is disposed at a position vertically lower than the axial centerline of the left and right wheel axles.

6. The automatic guided vehicle drive device recited in claim 4, wherein
at least a portion of the first shaft portion is housed in the recessed portion.

7. The automatic guided vehicle drive device recited in claim 3, wherein the spring member includes a coil spring arranged on an outside of at least one of the first and second shaft portions to be guided along the at least one of the first and second shaft portions.

8. The automatic guided vehicle drive device recited in claim 3, wherein
at least one of the first and second shaft portions has a hollow space passing axially therethrough.

9. The automatic guided vehicle drive device recited in claim 8, wherein
the drive mechanism of the drive unit includes an electric motor and an electric power line for exchanging electric power between the electric motor and a control device configured to drive and control the electric motor, and
the electric power line passes through the hollow space formed in the at least one of the first and second shaft portions.

10. The automatic guided vehicle drive device recited in claim 3, wherein
the spring member of the turning shaft mechanism exerts the biasing force against a bottom part of the first shaft portion disposed at a position near a point on the vertical line.

11. The automatic guided vehicle drive device recited in claim 10, wherein
the bottom part of the first shaft portion is disposed at a position vertically lower than the axial centerline of the left and right wheel axles.

12. The automatic guided vehicle drive device recited in claim 1, further comprising
an elevating mechanism operatively coupled to the turning shaft mechanism to selectively move the drive unit with respect to the top plate member in a vertical direction via the holding plate member.

13. The automatic guided vehicle drive device recited in claim 12, wherein
the elevating mechanism includes
a rotation motor,
a cam unit configured and arranged to convert a rotational motion of the rotation motor into a generally linear motion, and
a link member coupled to the turning shaft mechanism and configured and arranged to convert the generally linear motion of the cam unit into a generally vertical motion.

14. The automatic guided vehicle drive device recited in claim 1, wherein
the left and right wheel axles are spaced apart from each other in the axial direction to form a space therebetween with a part of the holding plate member being disposed in the space.

15. An automatic guided vehicle comprising:
a cart body; and
a drive device including
a top plate member attached to the cart body,
a drive unit having a left wheel axle attached to a left wheel and a right wheel axle attached to a right wheel with the left and right wheel axles being coaxially arranged and spaced apart from each other in an axial direction, and a drive mechanism operatively coupled to the left and right wheel axles to rotate the left and right wheels,
a holding plate member operatively coupled between the top plate member and the drive unit to pivotally hold the drive unit with respect to a movement direction of the vehicle, and
a turning shaft mechanism operatively coupled between the top plate member and the holding plate member to turnably support the drive unit with respect to the top plate member via the holding plate member about a vertical line passing through an intersection point between an axial centerline of the left and right wheel axles and a middle line that is oriented in the movement direction and passes through an approximate middle position between the left and right wheel axles, the turning shaft mechanism exerting a biasing force along the vertical line in a direction of separating the drive unit from the top plate member via the holding plate member.

* * * * *